US006324380B1

(12) United States Patent
Kiuchi et al.

(10) Patent No.: US 6,324,380 B1

(45) Date of Patent: Nov. 27, 2001

(54) DUAL-MODE SATELLITE/TERRESTRIAL MOBILE COMMUNICATION UNIT

(75) Inventors: Kazuya Kiuchi; Yuzuru Masuda; Hideto Ookita; Kazuo Nagamachi; Yoshio Sasaki, all of Kanagawa (JP)

(73) Assignee: Kyocera Corporation (JP)

(*) Notice: Subject to any disclaimer, the term of this patent is extended or adjusted under 35 U.S.C. 154(b) by 0 days.

(21) Appl. No.: 09/171,903

(22) PCT Filed: Feb. 25, 1998

(86) PCT No.: PCT/JP98/00765

§ 371 Date: Aug. 26, 1999

§ 102(e) Date: Aug. 26, 1999

(87) PCT Pub. No.: WO98/38754

PCT Pub. Date: Sep. 3, 1998

(30) Foreign Application Priority Data

Feb. 28, 1997 (JP) ........ 9-061909
Mar. 14, 1997 (JP) ........ 9-081988
Apr. 18, 1997 (JP) ........ 9-116165

(51) Int. Cl.[7] ........ H04B 7/26

(52) U.S. Cl. ........ 455/12.1; 455/98; 455/575

(58) Field of Search ........ 455/11.1, 12.1, 455/13.3, 98, 414, 575

(56) References Cited

U.S. PATENT DOCUMENTS 5,479,479 * 12/1995 Braithberg et al. ........ 379/58
5,490,284 * 2/1996 Itoh et al. ........ 455/11.1
5,628,049 * 5/1997 Suemitsu ........ 455/11.1
5,882,427 * 10/1998 Braithberg et al. ........ 379/454

* cited by examiner

*Primary Examiner*—Daniel Hunter
*Assistant Examiner*—Thuan T. Nguyen

(57) ABSTRACT

The present invention seeks to provide a dual mode mobile satellite communication unit, which requires low communication cost and very little battery power, does not require always carrying a large unit frame and does not always provide great weight burden on the user. A terrestrial communication portable unit is detachably mounted in the mobile satellite communication unit. The mobile satellite communication unit as base unit does not include a key operating section, a display section and a speech transducer section having a microphone and a loudspeaker, and utilizes those mechanically assembled on the portable unit side for keying and other operations.

In an interlocked relation to the removal of the portable unit, the stand-by state of the base unit is turned off. It is thus possible to avoid wasteful battery power consumption on the base unit side. Using a hollow cylindrical antenna, the inner cylindrical space thereof is used as a battery insertion space, thus dispensing with an independent battery mounting space. Very great space saving is thus attainable particularly in a mobile satellite communication unit, which requires high power and large size battery power supply.

14 Claims, 12 Drawing Sheets

5A
A
B
a
9a
13
33
14
15
16
17
17F
34

5A
A
1
4
2
3

5A
A
1
4
2 SLIDE BUTTON
3 ELECTRIC CONNECTOR

A
MODULATOR/ DEMODULATOR
CHANNEL CORDIAC
BOCODER
RADIO SECTION
LINK LAYER
INFRARED TRANSDUCER
BATTERY
SW
LED
INFRARED RAYS
COUPLING
B (B1 B2)
MMI (MAN-MACHINE INTERFACE)
DISPLAY
KEY
CORDIAC

A
5A
43
41
39
42
40
22
MODULATOR/ DEMODULATOR
CHANNEL CORDIAC
BOCODER
RADIO SECTION
LINK LAYER
R-F MODULATOR/ DEMODULATOR
45
BATTERY
SW
29
21
27
25
B (B1 B2)
13
MMI (MAN-MACHINE INTERFACE)
38
23
26
28
14
DISPLAY
17F
45
KEY
BATTERY
44
35
CORDIAC
37
33
34

100
CONSTELLATION
200
200
102
102
101
101
SWITCHING OFFICE
SWITCHING OFFICE
103
103
104
104
MU
MU

DUAL-MODE SATELLITE/TERRESTRIAL MOBILE COMMUNICATION UNIT

FIELD OF THE INVENTION

This invention relates to commonly termed mobile satellite communication units utilizing satellites orbiting around the earth as network switching nodes and, more particularly, to dual mode mobile satellite communication units, which can be used as mobile terrestrial communication unit for cellular or PHS communication systems utilizing terrestrial radio stations as well as the mobile satellite communication unit.

PRIOR ART

As an example of mobile satellite communication system, an iridium plan communication system of Motoroller Inc. in U.S.A. is well known in the art. FIG. 11 depicts the iridium plan communication system, which is shown in, for instance, Japanese Laid-Open Patent Publication No. 6-181456. A constellation 100 consists of, for instance, 66 satellites 200 moving along relatively low level orbits around the earth (not shown). Line-of-sight communication may be made from given points on the earth's surface with an obstructed view to one or more satellites. The constellation and the satellites which are moving along relatively low level orbits, are always moving relative to the earth. For example, a satellite moving along an orbit 765 km apart from the earth, is moving at a speed of about 25,000 km relative to an earth's surface point. This satellite is in the visual field of the earth surface's point for a period of at most about 9 minutes.

At every area or country on the earth's surface, a number of switching offices (SO) 101 are provided for data communication with satellites among adjacent ones of them via r-f trunking communication links 102. The satellites are also doing data communication with one another via trunking communication links.

A switching office 101 in any area on the earth can control communication (or calls) sent out to given points via the constellation 100. Each switching office 101 is coupled to a usual phone switching network (PSTN) 103 via a number of PSTN lines, and also can receive calls sent out from PSTN lines to mobile satellite communication line subscribers 104. The PSTN lines 103 can send out calls transmitted from the mobile satellite communication line subscribers 104.

As many as several million mobile satellite communication units MU are coupled to each mobile satellite communication line. The mobile satellite communication units MU can do communication at any place in an earth area covered by the mobile satellite communication network.

FIG. 12 shows a personal handyphone system (PHS) mobile communication system pertaining to the present invention (which is shown in, for instance, Japanese Laid-Open Patent Publication No. 7-187866). The system comprises a PHS control center 140 for storing position data, a plurality of relay stations 132 each wired via a digital switching office 131 and a common line signal network 130 to the PHS control center 140, and a plurality of base stations 120 wired to each of the relay stations 132. The relay stations 132 produces position data on the basis of position registration requests sent out from the base stations 120.

In the position registration in such a system, a PHS unit 110 receiving position data notified from the pertinent base station 120 checks the data. When the data is different from position registration data stored in it, the PHS unit 110 sends out a position registration signal to the base station 120 in the radio zone (or position registration area 134) in which the user is present. The position registration signal is relayed by the relay station 132 and arrives at the PHS control center 140 in a converted form necessary for switching. The present position data of the PHS unit 110 is thus stored in the PHS control center 140. The above operation is executed whenever the position registration area 134 is changed by movement of the PHS unit 110.

When the number of the PHS unit 110 is dialed from a general subscriber phone, the transmission side digital switching office 131 interrogates the PHS control center 140 via the common line signal network 130 about the position registration area 134 in which the PHS unit 110 of the dialed number is present, i.e., about position registration data necessary for switching. On the basis of this position registration data, tracing connection is made, and the base stations 120 in the pertinent position registration area 134 make a general terrestrial radio wave calling.

When a PHS unit 110 dials a general subscriber phone number, the subscriber certification data number of the PHS unit 110 is transmittedd together with the phone number via the base station 120 to the relay station 132. The relay station 132 identifies the PHS unit 110 and confirms that the transmitter is a subscriber. Then, a line concerning the general subscriber phone is connected.

As is seen from the above description of the prior art, the mobile satellite communication unit is capable of making communication at any place on the earth under the mobile satellite communication network. A problem, however, is posed that high power is necessary for electromagnetic waves to reach the constellation which is utilized as network switching nodes, because the constellation is disposed along orbits spaced apart by 765 km from the earth.

In the mobile satellite communication unit, therefore, not only the transmitting circuit but also the battery power supply are inevitably large in size. Consequently, the unit requires high communication cost and much battery consumption, and also its frame has a large size. That is, a large size frame should always be carried as the mobile satellite communication unit. Unlike the case of carrying a recent small size unit, this is a great weight burden on the user.

The mobile terrestrial communication unit for the PHS or cellular system, on the other hand, in spite of its restriction that it permits communication in only prescribed areas, is for communication by transmitting and receiving data to and from a base station close to it. Thus, unlike the mobile satellite communication unit, the transmitting circuit and the battery power supply of the unit are small in size, and also the unit requires low communication cost and little battery consumption.

An advantageous mobile satellite communication unit is a duel mode one, which can provide the functions of both the units, i.e., those of the mobile satellite communication unit and the mobile terrestrial communication unit. Such a dual mode unit, however, is large in size and heavy in weight. Nevertheless, it should always be carried even by the user who uses the sole mobile terrestrial communication unit function (i.e., utilizes the sole cellular system of PHS services). This is a great weight burden on the user compared to the case of carrying the recent small size cellular system or PHS unit.

A further problem is that for mobile satellite communication which covers the whole globe, it is necessary to use different dual mode units in correspondence to different mobile terrestrial communication units depending on areas where the units are sold and used. To solve this problem, units in which a terrestrial communication function cartridge (including a ratio section, communication system control programs and a data memory) can be detachably inserted, have been investigated. Such units, however, again dictate carrying a large unit frame.

SUMMARY OF THE INVENTION

The present invention, in view of the above technical problems, has an object of providing a dual mode mobile satellite communication unit, which requires as low communication cost and as little battery power as possible, neither requires always carrying a large size unit frame nor necessitates user's great weight burden.

Another object of the present invention is to provide a mobile satellite communication unit, which can be readily carried and permits volume reduction.

The above and other objects of the present invention will become clear from the following description of the present invention.

In solving the problems described before, it is a preamble of the present invention that a dual mode mobile satellite communication unit, which provides the mobile terrestrial communication unit function in addition to the function of a mobile satellite communication unit utilizing satellites orbiting around the earth.

The dual mode mobile satellite communication unit features that:

it comprises a base unit not including at least a key operating section, a display section and a speech transducer section having a microphone and a loudspeaker and capable of providing the mobile satellite communication unit function; and a terrestrial communication portable unit including a key operating section, a display section and a speech transducer section having a microphone and a loudspeaker and providing a pertinent mobile terrestrial communication unit function;

wherein recesses and projections are provided as mechanical copulters on the two units for mechanically coupling the two units to each other, and electric connectors are provided on the two units for electrically connecting the key operating section, the display section and the speech transducer section having the microphone and the loudspeaker on the side of the terrestrial communication portable unit and a mobile satellite communication unit function section on the side of the base unit to one another when the two units are mechanically coupled to one another.

With this construction, independent battery power supplies may be provided in the terrestrial communication portable unit and in the base unit providing the mobile satellite communication unit function, and in terrestrial service areas the small size terrestrial communication portable unit alone may be carried for use.

In this case, in an interlocked relation to the dismounting of the terrestrial communication portable unit, a stand-by state of the base unit is switched off, and it is possible to avoid wasteful battery power consumption on the side of the base unit.

When it is forecast that the user carrying the portable unit gets out of a terrestrial service area, the portable unit is mechanically coupled to the base unit, whereby the key operating section, the display section and the speech transducer section on the side of the portable unit and the mobile satellite communication unit function section on the side of the base unit are electrically connected to one another. In this state, the unit can be used at any locality on the earth as the mobile satellite communication unit by utilizing the key operating section and the display section of the portable unit.

The provision of the key operating section and the speech transducer section on the side of the terrestrial communication portable unit, makes it possible, in the case where a phone number memory for call transmission is provided in the portable unit for satellite communication, to make common use of functions (such as call tone transmission) provided in the portable unit and also make common use of a phone book registered in an internal memory. It is thus not necessary to register the phone book independently on the sides of the two units.

In a preferred form of the present invention, a single electric connector is provided for making the above electric connection, and a plural mechanical couplers capable of being held spaced apart by different distances are provided for the mechanical coupling of the two units. With this construction, a plurality of portable units having different shapes (i.e., coupling widths) can be selectively mounted so long as their electric connectors are at a regular position of connection. It is thus possible to select desired portable units, such as PHS and cellular system ones. Also, portable units of different communication systems can be mounted in different countries visited in business trips or the like.

In another preferred form of the present invention, a rail-like mechanical coupler movable in a predetermined axial direction is provided for the mechanical coupling, and an electric connector for the electric connection is disposed at the end of movement axial direction of the mechanical coupler and in a fixed plane containing the path of movement axis of the mechanical coupler. With this construction, a portable unit having any shape and having a rail-like recess formed in the rear surface can be mounted so long as its electric connector is at a regular position of connection. In addition, since the electric connector is located in the fixed plane containing the path of movement of the mechanical coupler, reliable electric connection can be ensured. Moreover, shocks generated when dismounting the portable unit is received in the above movement path plane, thus eliminating the possibility of rupture of the electric connector.

The above dual mode mobile satellite communication unit suitably has the following circuit construction.

The present invention features that the base unit which does not include at least the key operating section, the display section and the speech transducer section having the microphone and the loudspeaker and is capable of providing the mobile satellite communication unit function, includes a signal transceiver section for transmitting and receiving converted wave of transmission and reception signals, preferably PCM data, to and from the separate terrestrial communication unit.

Particularly, the present invention features, in the above combination of mobile satellite communication base unit and terrestrial communication portable unit:

a mobile satellite communication unit as a base unit not including at least a key operating section, a display sections and a speech transducer section having a microphone and a loudspeaker, capable of providing the mobile satellite communication unit function and including a first converted wave transceiver section for transmitting and receiving converted waves of transmission and reception signals to and from a signal transceiver section of the separate mobile terrestrial communication unit; and a terrestrial communication unit as a portable unit including a key operating section, a display section and a speech transducer section having a microphone and a loudspeaker, providing a pertinent terrestrial communication unit function and including the second converted wave transceiver section as noted above, for transmitting and receiving converted waves of transmission and reception signals to and from the signal transceiver section of the mobile satellite communication base unit;

wherein the portable unit is used for terrestrial communication, and the mobile satellite communication unit can be used as base unit for transmission and reception via the first and second converted wave transceiver sections by utilizing the key operating section and the speech transducer section having the microphone and the loudspeaker of the portable unit during mobile satellite communication.

For short distance transmission and reception, the first and second converted wave transceiver sections suitably use infrared transducers or r-f modulator/demodulators, which can transmit infrared rays or weak electromagnetic waves. As an alternative, it is possible to permit wired transmission and reception in lieu of the radio transmission and reception.

With this construction, in terrestrial service areas the user can receive terrestrial services by carrying the small size terrestrial communication portable unit alone.

When the terrestrial and satellite communication units are disposed in nearby localities in a terrestrial service area and in a distance range permitting transmission of infrared rays and weak electromagnetic waves, a call received by the mobile satellite communication unit for an iridium plan communication system line, is transmitted via the first and second converted wave transceiver sections to the speech transducer section on the side of the mobile terrestrial communication portable unit, for doing predetermined transmission and reception by driving loudspeaker or vibrator.

Suitably, when the user is carrying the small size terrestrial communication portable unit alone and moving to increase the distance between the two units and gets out of the range permitting transmission between the first and second converted wave transceiver sections, a stand-by state of the mobile satellite communication base unit is turned off. Suitably, thus, the stand-by state is also turned off in an interlocked relation to the dismounting of the portable unit. In these ways, it is possible to avoid wasteful battery power consumption on the side of the mobile satellite communication unit.

When it is forecast that the user gets out of a terrestrial service area, the terrestrial communication portable unit is electrically coupled to the mobile satellite communication base unit. By so doing, it is possible to send out a call from the side of the mobile satellite communication base unit to satellites by utilizing the key operating section and the display section on the side of the terrestrial communication portable unit. In this way, it is possible to use the unit at any locality on the earth.

The provision of the key operating section and the speech transducer section on the side of the terrestrial communication portable unit, makes it possible, in the case where a phone number memory for call transmission is provided in the portable unit for satellite communication, to commonly use such functions as call tone transmission provided in the portable unit and also commonly use a phone book registered in an internal memory. It is thus not necessary to register the phone book independently on the sides of the two units.

Since the mobile satellite communication unit does not have any key operating section, any display section and any speech transducer section having a microphone and a loudspeaker, its weight can be correspondingly reduced. Besides, since this unit can be made integral with the portable unit by electric coupling, the user can carry the portable unit, which is super-light in weight, in a suit pocket while putting the heavy mobile satellite communication unit in a briefcase so long as the user is in an area permitting transmission between the first and second converted wave transceiver sections.

According to the present invention, it is possible to selectively use the terrestrial communication portable unit for short distance communication and the mobile satellite communication unit for long distance communication. The communication cost thus can be logically reduced. In addition, since the key operating section and the speech transducer section are provided only on the terrestrial communication portable unit side, the weight of the mobile satellite communication unit can be correspondingly reduced.

According to the present invention, it is possible to selectively mount a plurality of portable units different in the shape and the terrestrial communication specifications so long as they have the second converted wave transceiver. It is thus possible to select desired portable units, such as PHS and cellular system ones. It is also possible to select different portable units in different countries visited in business trips or the like. It is thus possible to obtain electric coupling.

The mobile satellite communication unit has a further problem that it should have a large battery accommodation space. Since this unit requires high power so that transmitted waves can reach constellation, the battery used is inevitably large in size, dictating large size and large wall thickness of the frame and resulting in a frame, which is very inconvenient to hold from the human engineering standpoint.

The present invention features, in a commonly termed mobile satellite communication unit utilizing satellites orbiting around the earth as network switching nodes, that an antenna section including a microstrip planar antenna at an end is formed such that it has a hollow cylindrical shape and that a battery insertion space is formed in the hollow cylindrical space underneath the microstrip planar antenna.

The antenna section may be capable of elongation and contraction, tilting or rotatable with respect to the unit frame, or it may be secured thereat. The antenna may be mounted in any manner. Suitably, however, the antenna is capable of controlling its angle and also can be pulled out for use because the mobile satellite communication unit transmits and receives weak and highly directive digital signals with respect to satellites.

The antenna may be the sole microstrip planar antenna, or it may be a composite antenna obtained by coaxially arranging a microstrip planar antenna and a helical antenna.

The present invention further proposes, as a preferred shape of unit which accommodates the above antenna, one constituted by a vertically elongate frame having an large thickness portion formed on one side, the hollow cylindrical antenna being inserted in the large thickness portion.

This unit can be used as a single mode mobile satellite communication unit, which independently permits keying operation and also transmission and reception. Suitably, however, the unit is used as a dual mode mobile satellite communication unit, with which keying operation and also transmission and reception can be made by utilizing a key operating section, a display section and a speech transducer section having a microphone and a loudspeaker of a separate mobile communication unit for PHS or terrestrial communication.

When applying the present invention to a single mode mobile satellite communication unit independently capable of keying operation and also transmission and reception, suitably the unit frame has an asymmetric transversal sectional profile with respect to its front face having a key operating section and a display section, such that a large thickness portion is formed on one side and a small thickness portion on the other side behaind the front face, a hollow cylindrical antenna being inserted in the large thickness portion, the inner cylindrical space of the antenna being used as a battery insertion space.

When applying the present invention to a dual mode mobile satellite communication unit which utilizes, for keying operation and also transmission and reception, a key operating section and a speech transducer section of a mobile terrestrial communication unit, suitably the unit frame has a front mounting section for mounting the separate mobile terrestrial communication unit, a large thickness portion is formed on one side behind the mounting section, a hollow cylindrical antenna being inserted in the large thickness portion, the inner cylindrical space of the antenna being used as a battery insertion space.

As described before, suitably such a mobile satellite communication unit does not include at least a key operating section, a display section and a speech transducer section having a microphone and a loudspeaker and is capable of keying operation and also transmission and reception by utilizing a key operating section and a speech transducer section of a mobile terrestrial communication unit which is detachably mounted in the mounting section.

With the antenna having as hollow cylindrical shape such that the inner cylindrical space is used as a battery insertion space, an independent battery mounting space is unnecessary. It is thus possible to attain very great space saving particularly in a mobile satellite communication unit requiring high power and hence a large size battery power supply.

In this case, it is necessary for the portable unit side antenna to hold communication sensitivity in all directions around the apex in order to be able to maintain line quality for variations of the relative position relation of satellite unit antenna. Accordingly, the antenna is formed a composite antenna comprising a microstrip planar antenna and a helical antenna in coaxial arrangement, thus improving the directivity at low elevation angle and also the axial ratio thereat.

In the mobile satellite communication unit, a plurality of large size batteries are used in series connection. Therefore, the cylindrical antenna inevitably tends to be large in diameter and length.

According to the present invention, this is coped with by the longitudinally elongate unit frame as noted above, having a large thickness portion formed on one side, the hollow cylindrical antenna being inserted in the large thickness portion.

When such a frame shape is adopted, it is a problem which side the large thickness portion is formed on.

According to the present invention, the location in which to form the large thickness portion for antenna insertion is specified.

The portable unit is held with one hand while doing key operation with the other hand. The unit is thus held in a space defined by the thumb and the index finger. This space is wedge-like, flaring from the root to the tip of the thumb. In order for the portable unit to be held in such a space having a wedge-like triangular sectional profile, suitably the unit also has a wedge-like triangular sectional profile. This is suitable from the human engineering standpoint.

Suitably, the unit has a flat front face for providing the key operating section, display section and so forth.

According to the present invention, in a unit which is independently permitting keying operation and also transmission and reception, the unit frame has an asymmetric transversally sectional profile with respect to the front face having the key operating section and the display section, such that a large thickness portion is formed on one side and a small thickness portion on the other side behind the front face, a hollow cylindrical antenna being inserted in the large thickness portion.

The mobile satellite communication units can be utilized for short distance communication as well as long distance and overseas communications. When utilized for the short distance communication, however, the communication cost is increased. Suitably, therefore, a dual mode mobile satellite communication unit is used in combination with a mobile terrestrial communication unit for PHS or cellular system communication.

The present invention is accordingly applied to a unit, which is suitable as a dual mode mobile satellite communication unit utilizing, for key operation and also transmission and reception, a key operating section and a speech transducer section of a mobile terrestrial communication unit. Specifically, the frame of the unit has a front mounting section for mounting a separate mobile terrestrial communication unit, and a large thickness portion formed on one side behind the mounting section, a hollow cylindrical antenna being inserted in the large thickness portion, the inner cylindrical space of the antenna being used as a battery insertion space.

BRIEF DESCRIPTION OF THE DRAWINGS

FIG. 2(A) is a partly broken-apart front view showing the unit shown in

FIG. 5(B) is a partly broken-apart perspective view showing the unit shown in

FIG. 5(A),

FIG. 5(C) being a perspective view showing the unit with a portable unit mounted in the base unit;

DETAILED DESCRIPTION OF THE PREFERRED EMBODIMENTS

Preferred embodiments of the invention will now be described by way of examples in details with reference to the drawings. It is to be construed that unless otherwise specified, the sizes, materials, shapes, dispositions, etc. of components described in connection with the embodiments are not limitative but merely exemplary.

FIGS. 1(A) to 1(C), 2(A) and 2(B) show a dual mode mobile satellite communication unit embodying the invention. Designated by A is a base unit, which excludes at least a key operation section, a display section and a speech transducing section having a microphone and a loudspeaker and is necessary for providing the iridium plan communication system unit function. Designated at B is a portable unit, which is used for PHS or cellular system communication and provides the well-known mobile terrestrial communication unit function.

The base unit A has a vertically elongate, substantially rectangular shape and has a substantially rectangular recess 1 open on the front and extending substantially over the entire vertical dimension of it. The portable unit B for the PHS or cellular system communication etc. can be accommodated in the recess 1.

In the recess 1, an electric connector 3 is disposed such that it can be raised from and lowered to the bottom of the recess 1 by vertical sliding of a slide button 2, which is provided in a side wall of the unit A and also serves as a power switch thereof. A pair of inner mechanical coupler projections 4 are in right and left side of inner walls of the unit defining the recess 1. The mechanical coupler projections 4 are biased by spring forces toward each other.

Figure 1C:
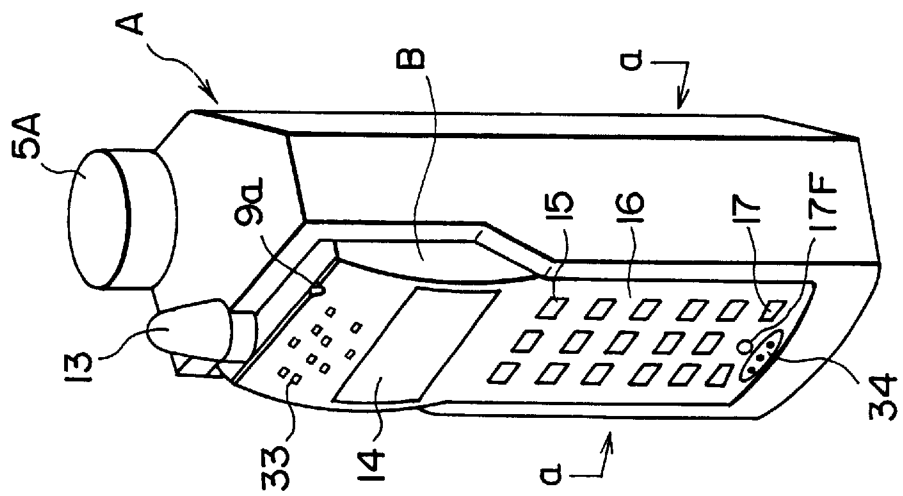
FIG. 1(C)
Figure 1B:
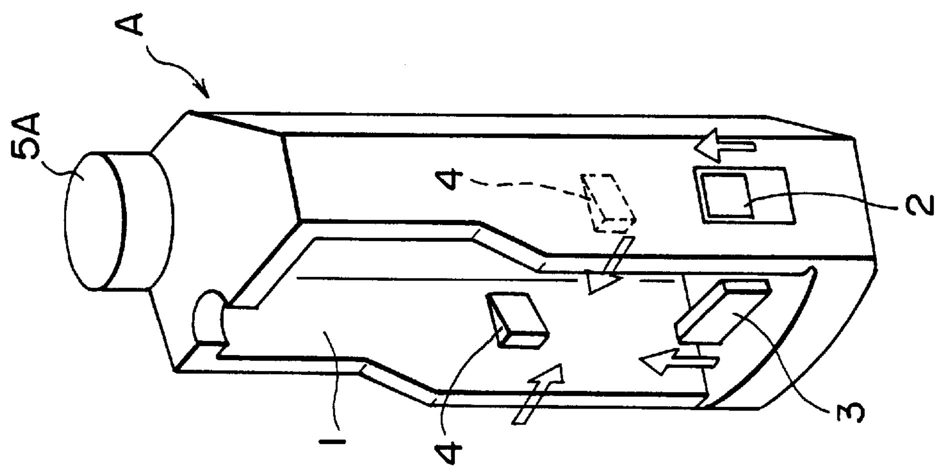
FIGS. 1(A) to 1(B) show a dual mode mobile satellite communication unit as a first embodiment of the invention, FIG. 1(A) showing the unit with an electric connector of a base unit for iridium plan satellite communication held in a buried state, FIG. 1(B) showing the unit with the electric connector in a raised state, FIG. 1(C) showing the unit with a portable unit mounted in the base unit.
Figure 1A:
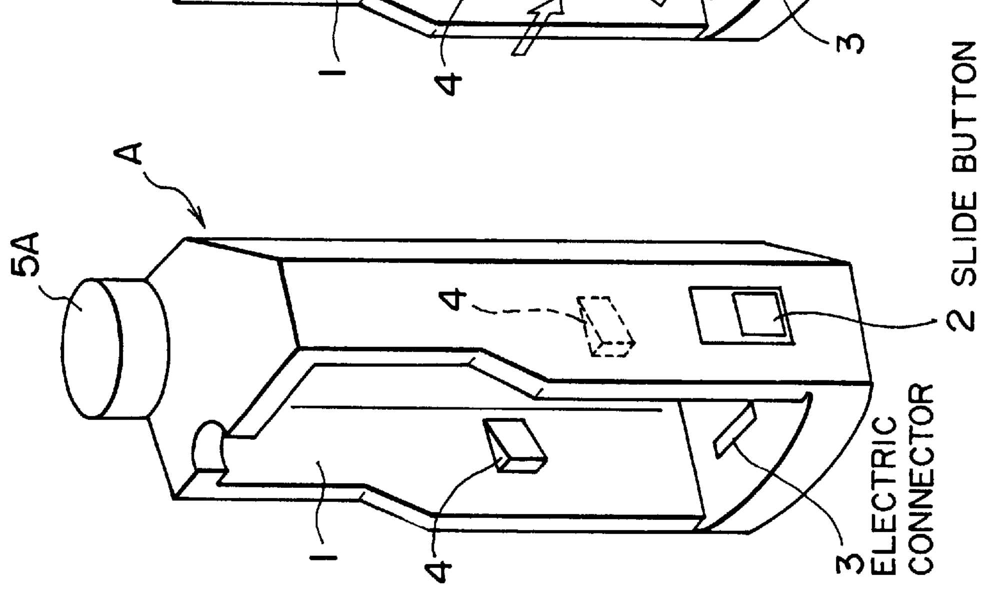
Figure 2A:
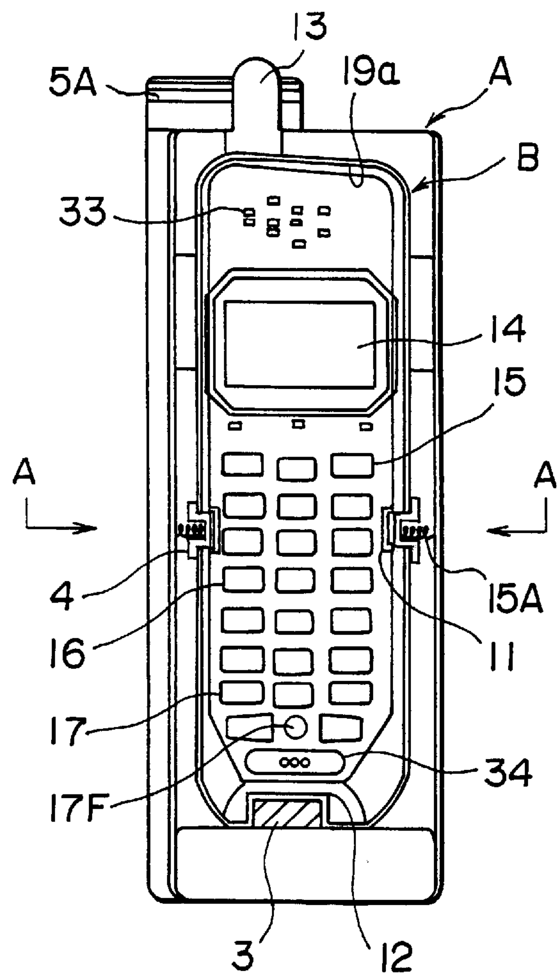
Figure 2B:
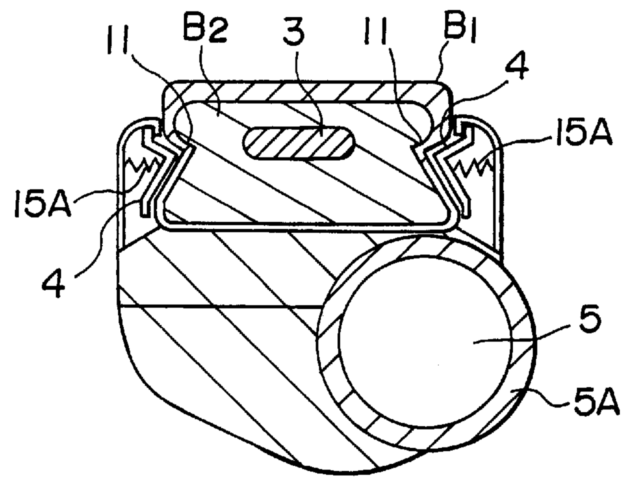
FIG. 2(B) is a sectional view taken along line a—a in FIG. 1(C);, omitting the internal construction.

As shown in FIG. 2(B), each of the mechanical coupler projections 4 has a substantially right triangular sectional profile with a wedge-like end. The end of the mechanical coupler projection 4 can be engaged in and secured to an associated mechanical coupling recess 11 on the side of the portable unit B by a biasing spring 15A disposed inside the mechanical coupler projection 4.

The dimension of the mechanical coupler projection 4 up to the wedge-like end thereof is set as desired; for instance, it is set such as to permit selective mounting of a plurality of PHS and cellular system communication units having different shapes (i.e., widths) as the portable unit B.

More specifically, for the portable unit B for PHS and cellular system communication it is a preamble that an electric connector accommodation recess 12 formed at the bottom and the mechanical coupler recesses 11, which receive the wedge-like ends of the mechanical coupler projections 4 provided on the right and left side walls of the base unit A, are at a fitted position of connection. With this arrangement, it is possible to mount the portable unit B1 and B2 having different shapes (i.e., widths) as shown in FIG. 2(B).

In this embodiment, the top wall of the recess 1 is partly removed so that an antenna 13 of the portable unit B can penetrate the top wall of the recess 1.

The base unit A has such a transversally sectional profile that its rear surface has a convex portion on one side, a cylindrical space 5 capable of accommodating a large size battery is formed in the convex portion, and a cylindrical frame 5A of the cylindrical space 5 serves as an antenna.

As described above, the portable unit B of this embodiment, used for PHS and cellular communication, has the electric connector accommodation recess 12 formed at the bottom and the mechanical coupler recesses 11 formed in the right and left side surfaces. The portable unit B also has the antenna 13 which extends upright from a left side portion of the top, a receive-call lamp 19 and a receiver loudspeaker 33 provided on a upper portion of its front face, and a display section 14 provided on a lower front face portion for displaying such various information as data transmitted by key operation or the like.

The front face lower portion further has a power switch, a call switch for transmitting a call signal, service keys 15 constituted by on-hook switches and so forth, ten keys 16 provided under the service keys, and function keys 17 for volume control, function selection and various other functions. Together with the function keys 17, a select key 17F having an LED is provided for selecting an iridium plan communication line. By depressing the select key 17F, the LED is turned on to notify that the iridium plan communication line has been connected. Designated at 34 is a microphone.

The select key 17F is electrically controlled such that the LED is turned on when and only when the electric connector 3 on the side of the base unit A is electrically connected.

In this embodiment, by pushing down a pertinent portable unit B into the base unit A in a state which the slide button 2 is in the lower set position so that the electric connector 3 is held buried in the bottom (i.e., in a power "off" state), the wedge-like ends of the pair mechanical coupler projections 4 provided on the right and left inner side walls of the recess 1, are pushed further apart against the spring forces biasing them, and then click engaged in the mechanical coupler recesses 11 provided in the side surfaces of the portable unit B by the spring forces biasing them.

After the engagement, by raising the slide button 2 the electric connector 3 is raised from its position in the bottom, and enters in and is secured to electric connector accommodation recess 12 formed at the bottom. The two units are thus reliably secured to each other by the three-point support. In addition, the slide button 2 also serves as a power switch, and power supply to the base unit A is on-off operated in an interlocked relation to the securing of the portable unit B in position. It is thus possible to avoid wasteful battery power consumption.

Figure 3:
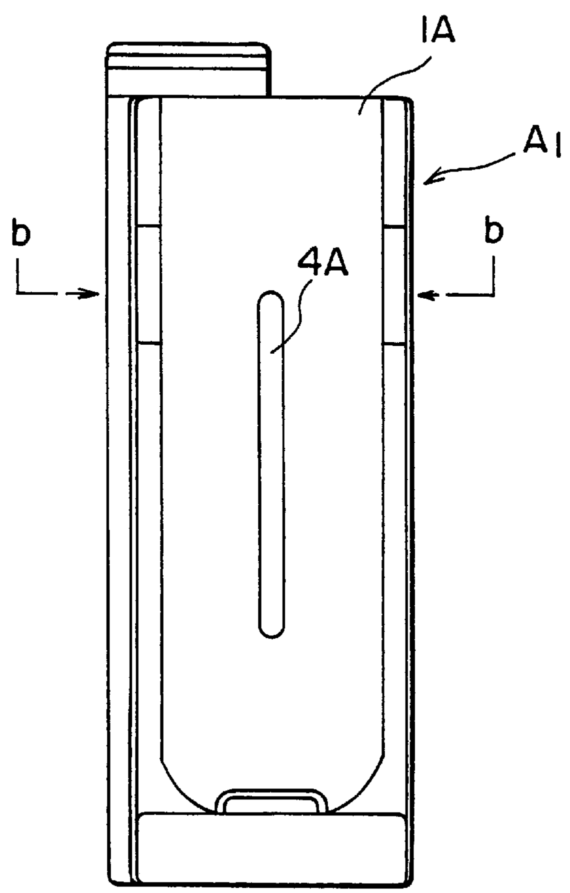
FIG. 3 is a front view showing a dual mode mobile satellite communication unit as a different embodiment of the invention.
Figure 4:
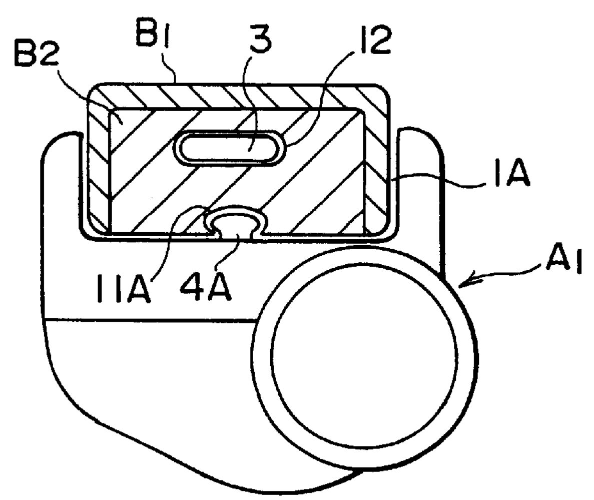
FIG. 4 is a sectional view taken along line b—b in FIG. 3, not showing the internal construction of the unit with a portable unit mounted therein.

FIGS. 3 and 4 show a different embodiment of the dual mode mobile satellite communication unit. Again in this embodiment, a base unit A1 has a vertically elongate, substantially rectangular shape and has a substantially rectangular recess 1 open on the front and extending substantially over the entire vertical dimension of it. In this embodiment, however, the base unit A1 does not have any top wall of the recess 1A, thus permitting a portable unit B to be slidably inserted from above into it. In addition, the base unit A1 has a vertical rail-like ridge 4A extending along the front surface of the rear wall defining the recess 1A and having an inverted trapezoidal transversal sectional profile. An electric connector 3 is raised on the bottom.

The portable unit B for PHS or cellular communication has a vertical rail-like recess 11A for slidably receiving the rail-like ridge 4A. An electric connector accommodation recess 12 is recessed at the bottom.

In this embodiment, by slidably inserting the portable unit B down into the recess 1 with the rail-like ridge 4A engaged in the rail-like recess 11A, the electric connector 3 is received in and secured to the electric connector accomodation recess 12. In the portable unit B for PHS and cellular communication in this embodiment, the electric connector accommodation recess 12 recessed at the bottom and the rail-like recess 11A which is engaged by the rail-like ridge 4A, are at a fitted portion of connection each other. Thus, as shown in FIG. 4, it is possible to selectively mount the portable units B1 and B2 having different shapes (i.e., widths), and the two units A and B can be reliably secured to each other by two-surface support, i.e., the bottom surfaces and rear surfaces.

FIGS. 5(A) to 5(C) and 6 show a further embodiment of the dual mode mobile satellite communication unit according to the invention. The difference of this embodiment from the previous embodiments will mainly be described. The base unit A has an infrared transducer 12*a* provided on the bottom of the recess 1, and the portable unit B has an infrared transducer 3*a* provided at the bottom. The infrared transducers 12*a* and 3*a* can be brought into a face-to-face relation to each other for effecting electric connection. The base unit A has a pair of mechanical coupler projections 4 provided on the right and left inner wall surfaces of the recess 1 and biased by spring forces toward each other.

The base unit A has a power switch 2 provided on one side wall. By turning on the power switch 2, a satellite communication stand-by state is brought about. It is possible to provide, in addition to the power switch 2, second switches 11F each in each mechanical coupler recess 4 to permit automatic switching between satellite communication stand-by state and "off" states in an interlocked relation to the mounting of the portable unit B.

An LED 21 provided on the top of the base unit A, permits judgment as to whether the satellite communication state is "stand-by" or "off", and also whether a satellite communication call is being transmitted or received. The LED 21 indicates the satellite communication "off" state by emitting red light, indicates the satellite communication stand-by state by emitting green light, indicates a state of call transmission or reception by emitting flickering green light, and indicates the state that the battery has been used up by emitting flickering red light.

As described above, the portable unit B for PHS or cellular system communication in this embodiment has the infrared transducer 12*a* provided on the bottom and the mechanical coupler recesses 11 provided on the right and left inner side wall surfaces, and also has the permissive switches 11F, which are disposed in the mechanical coupler recesses 11 and permits the use of the iridium plan communication line. When the permissive switches 11F are depressed via the mechanical coupler recesses 11 and the power switch 2 is turned on, the display section 14 notifies that the iridium plan communication line has been connected.

In this embodiment, by forcibly inserting a pertinent portable unit B down into the recess 1 of the base unit A with the power switch 2 held "on", the wedge-like ends of the mechanical coupler projections 4 provided on the right and left inner side wall surfaces of the recess 1, are pushed further apart against the spring forces biasing them, and then click engaged in the mechanical coupler recesses 11 provided on the side of the portable unit B, thus depressing the permissive switches 11F via the mechanical coupler recesses 11.

By making the above engagement, the display section 14 notifies that the iridium plan communication line has been connected, and at the same time the infrared transducers 3*a* and 12*a* of the two units are brought into a face-to-face relation to each other to effect electric connection.

Figure 5C:
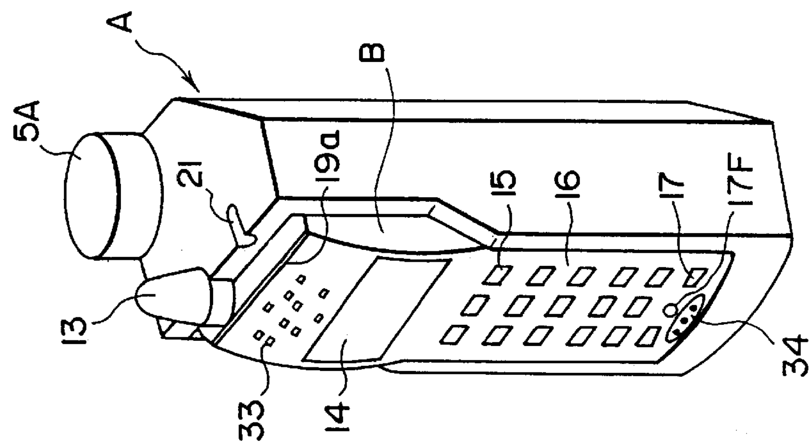
FIGS. 5(A) to 5(C) show a dual mode mobile satellite communication unit as a further embodiment of the invention, FIG. 5(A) being a perspective view showing a base unit for iridium plan satellite communication.
Figure 5A:
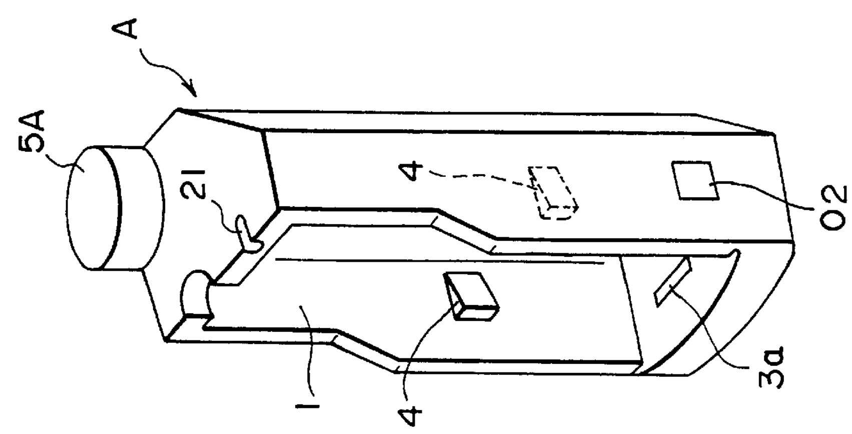
Figure 5B:
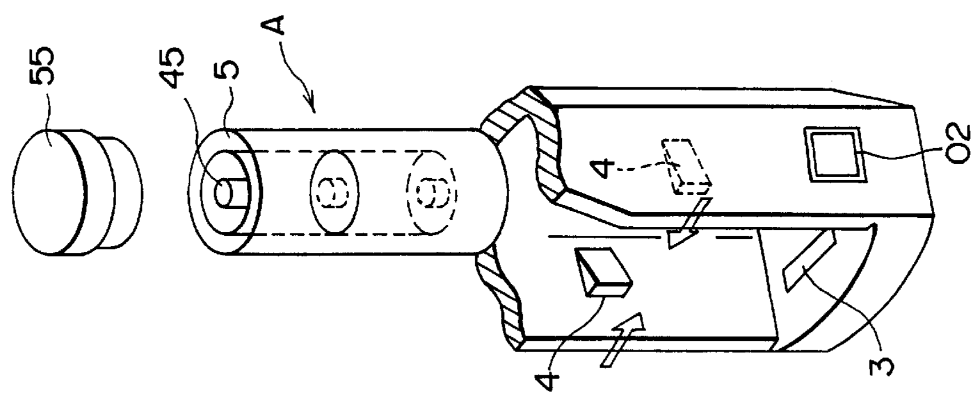
Figure 6A:
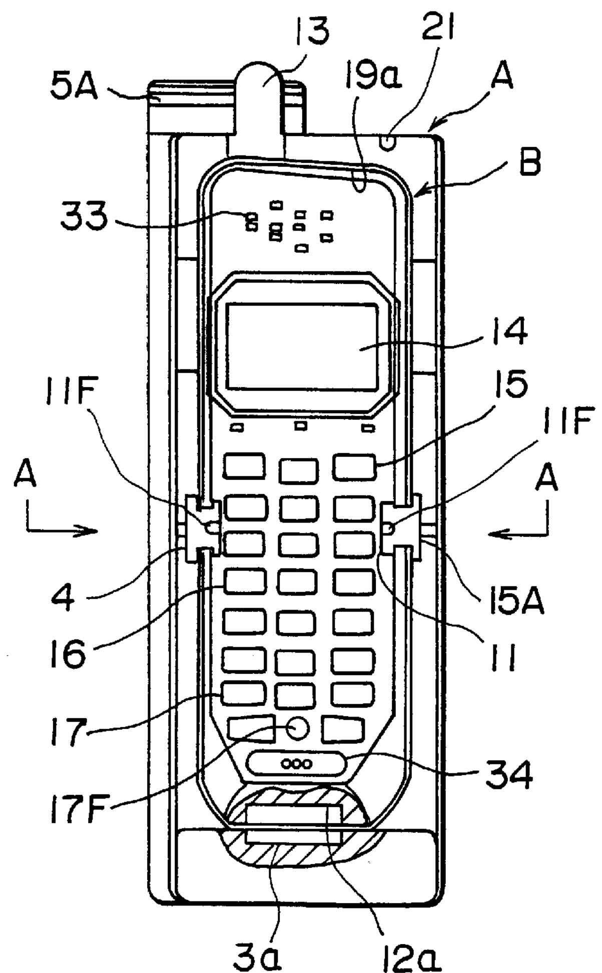
FIG. 6(A) is a partly broken-apart front view showing the unit shown in FIG. 5(C)
Figure 6B:
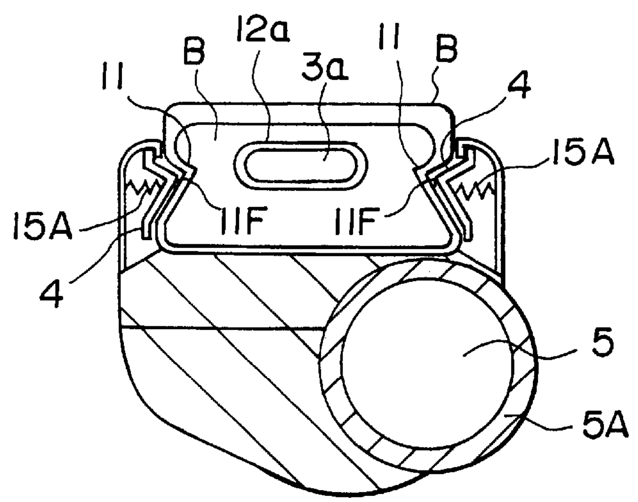
FIG. 6(B) is a sectional view taken along line A—A shown in FIG. 6(A);, omitting the internal construction.

The shape of the antenna in the base unit A used satellite communication in each of the above embodiments will now be described with reference to FIGS. 5(A) to 5(B) and 7.

As shown in FIGS. 1 to 7, specifically FIG. 2(B), the base unit A has such a transverse sectional profile that its rear surface has a convex portion formed on one side, i.e., on the right side (that is on the left side in the front view of the base unit A), of the vertical center. A cylindrical space 5A capable of accommodating a large size battery 45 is formed in the convex portion, and a cylindrical frame 5 of the cylindrical space 5A serves the role of a composite antenna.

Figure 7:
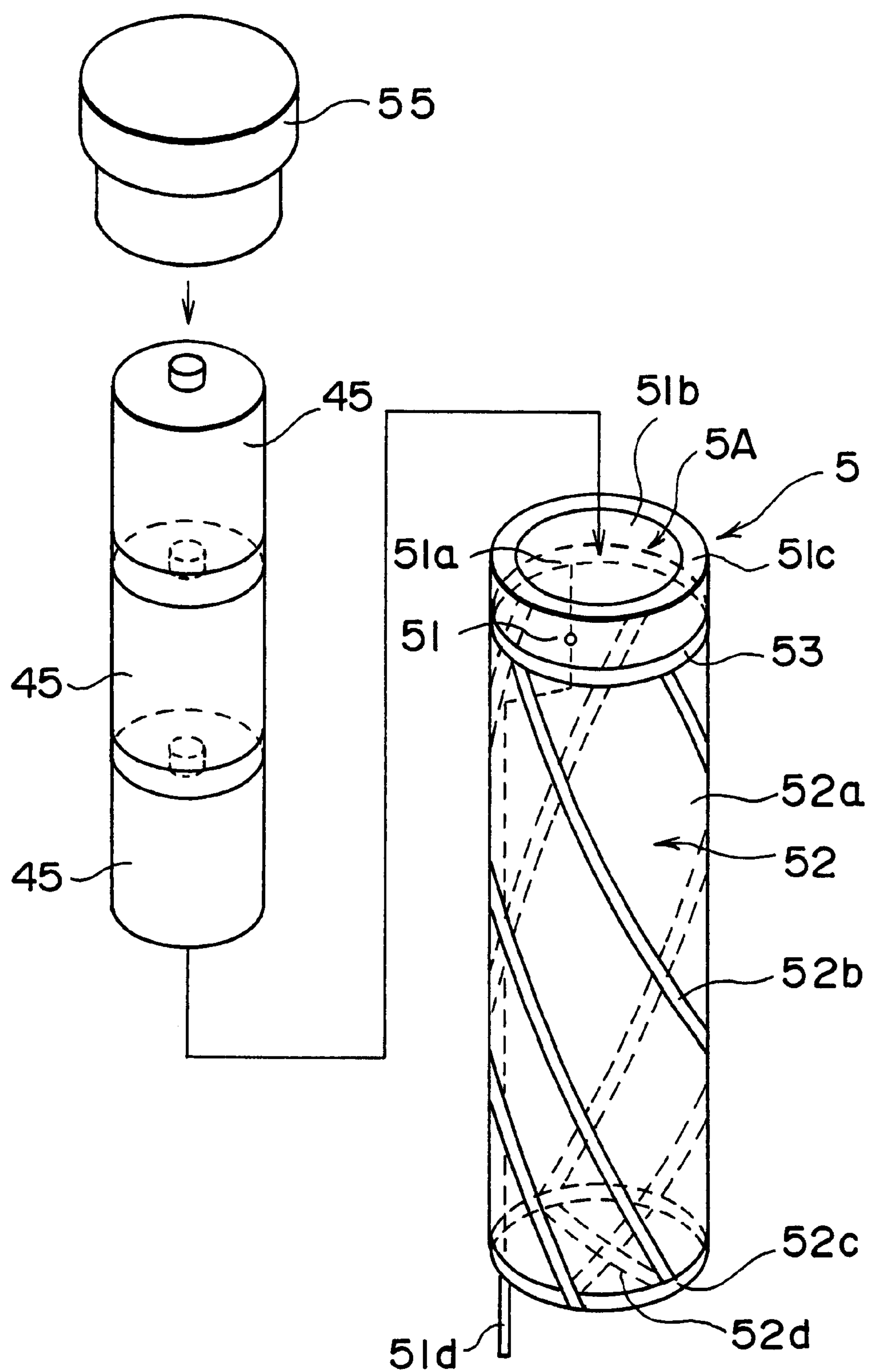
FIG. 7 is an exploded perspective view showing a composite antenna shown in FIG. 4.

The composite antenna 5, as shown in FIG. 7, comprises a microstrip planar antenna and a helical antenna, these antennas being coaxial to each other. In the figure, designated at 51 is a microstrip planar antenna (hereinafter abbreviated as MSA) of a single-point rear side power supply system, at 52 a helical antenna, and at 53 a disc conductor serving to ground the MSA 51 and also supplying power to the helical antenna 52.

Designated at 51*a* is a power supply pin of the MSA, 51*b* a batch-like radiating element of the MSA, 51*c* a dielectric base of the MSA, 52*a* a dielectric post supporting the helical antenna, 52*b* linear radiating element of the helical antenna, 52*c* an insulator for preventing a mutual contact of radiating element at the bottom intersection of the helical antenna. Designated at 52*d* is the intersection of radiating element at the bottom of the helical antenna 52. The power supply pin 51*a* is disposed at a position deviated from the diagonal center of the batch-like radiating element 51*b*. A power supply line 51*d* which is connected to the power supply pin 51*a* from the back side of the MSA 51, is led through the dielectric post 52*a* and on the outer side of a battery 45. The linear radiating element 52*b* are formed along the periphery of the dielectric post 52*a*, and their upper ends are connected DC-wise or capacitively to the conductor 53 for power supply.

In the MSA antenna 51, the desired frequency for circular polarization operation can be obtained by controlling the diameter and length of the cylindrical member, the dielectric constant and thickness of the dielectric base 51*c* and so forth. The frequency varies by several to several ten MHz depending on the width and size of the helical antennas 52, and it is necessary to preliminarily take the variations into considerations.

By making the helical antenna 52 and the MSA 51 to be identical in shape (i.e., sectional profile and size) as in this embodiment, substantially uniform directivity can be obtained substantially in all the directions to the apex from low elevation angles.

A plurality of single-phase dry cells 45 can be provided in series as battery power supply in the inside of the composite antenna by removing the MSA 51 (inclusive of the disc conductor 53), then the removed MSA 51 (inclusive of the disc conductor 53) can be mounted on the open antenna top, and a cap 55 can be fitted. When the MSA 51 is mounted, the power supply line 51*d* led along the inner wall surface of the composite antenna 5 is connected to the power supply pin 51*a*.

Figure 13A:
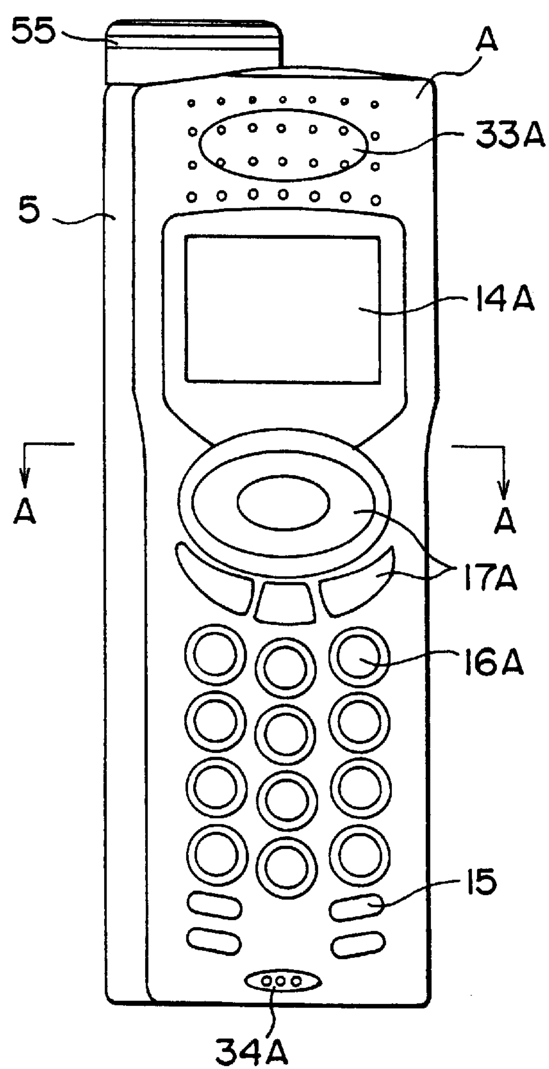
FIGS. 13(A) to 13(C) show a single mode mobile satellite communication unit for iridium plan communication, which is different from the above embodiments, FIG. 13(A) being a front view, FIG. 13(B) being a top plan view, FIG. 13(C) being a sectional view taken along line A—A in FIG. 13(A), omitting the internal construction.
Figure 13C:
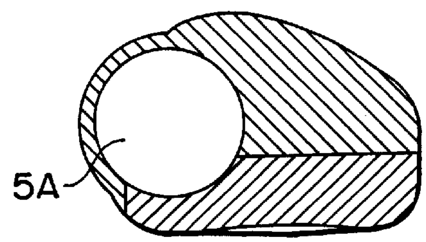
Figure 13B:
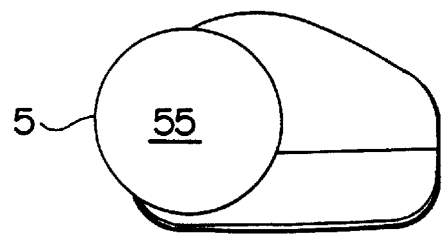

FIGS. 13(A) to 13(C) show a further embodiment of the invention, is a single mode mobile satellite communication unit constituted by the sole base unit A for iridium plan communication system without being combined with the portable unit B for terrestrial communication system.

The base unit A has a cylindrical space 5A capable of accommodating a large size battery 45, and a cylindrical frame 5 of the cylindrical space 5A serves as an antenna. This base unit A has a wedge-like triangular transversal sectional profile so that it can be readily gripped. This is suitable from the standpoint of the human engineering.

The base unit A has a vertically elongate, substantially rectangular shape, and its front face has a speech transducer section and various other circuits. The front face also has a receiver loudspeaker 33A and a display section 14A provided therebelow for displaying various information, such as data transmitted by key operation or the like.

The front face further has function keys 17A for volume control, function selection and various other functions and ten keys 16A provided in a lower portion. A power switch, a call switch and service keys 15 provided in a further lower portion and constituted by on-hook switches are provided on a further lower portion. Designated at 34A ia a microphone. For the remainder of the construction, the antenna 5 and the transverse sectional profile of the frame of this base unit are the same as those in the previous embodiments.

Figure 8:
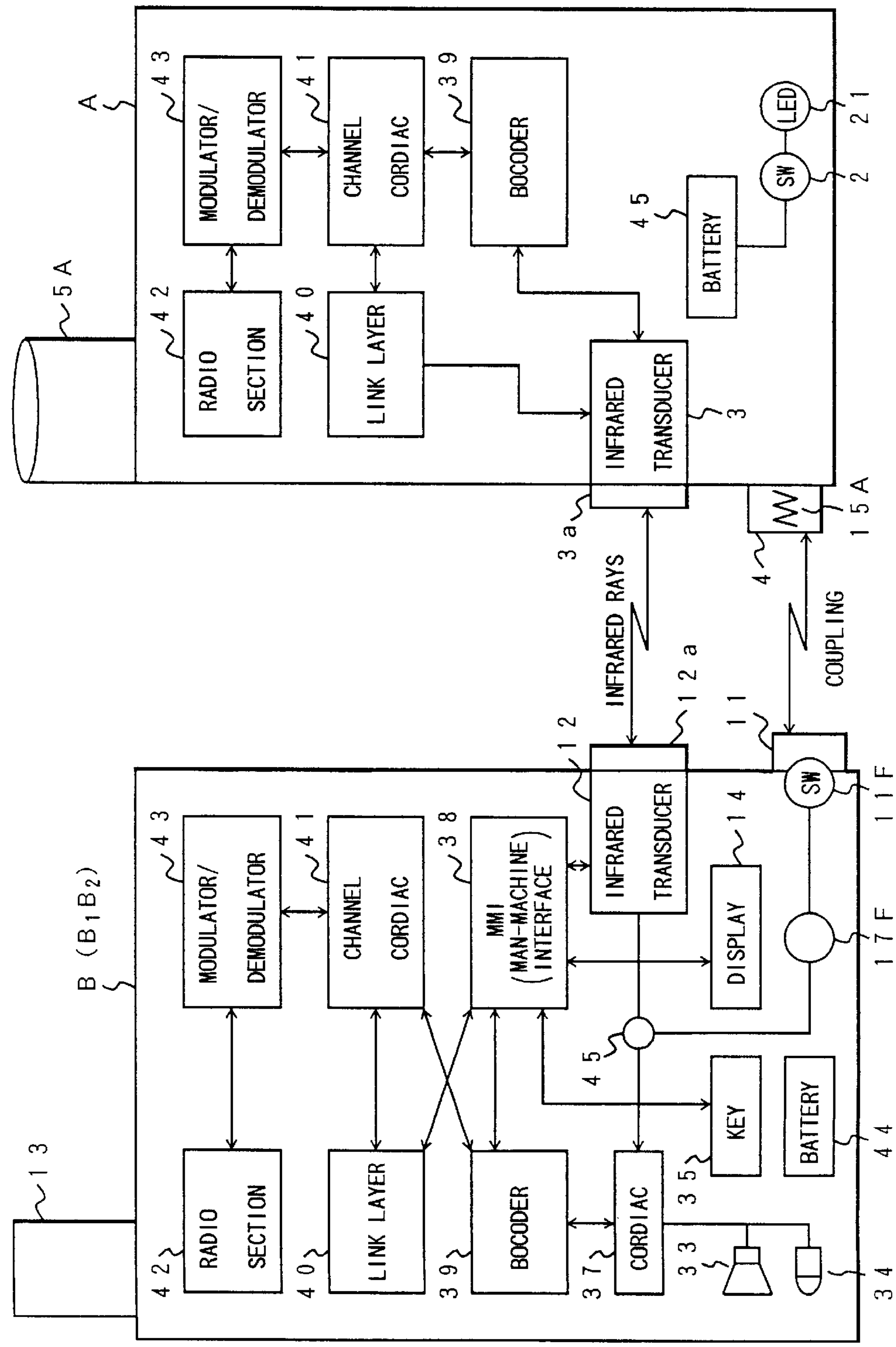
FIG. 8 is a block diagram showing the internal circuit construction of portable unit B and base unit A for iridium plan satellite communication in each of the above embodiments, the two units being coupled together such that signals are mutually transmitted and received via infrared transducers.

FIG. 8 is a block diagram showing the internal circuit construction of the base unit A for the iridium plan communication system and the portable unit B used in the previous embodiments shown in FIGS. 1 to 7, particularly the embodiment shown in FIGS. 5(A) to 5(C), 6(A) and 6(B).

Referring to the figure, provided on the side of the portable unit B are a microphone 34, a loudspeaker 33, a key section/controller 35 (including a phone book memory), a display section 14, a cordiac 37 for converting analog speech signal to PCM data and vice versa, and an MMI (man-machine interface) 38 performing such user's interface processes as key control and display section control.

An iridium plan communication unit function circuit, which is necessary for transmitting and receiving PCM data from the cordiac 37 via an iridium plan communication system line, is provided on the side of the base unit A. A terrestrial communication unit function circuit, which is necessary for transmitting and receiving PCM data from the cordiac 37 to and from base stations, is provided on the side of the portable unit B.

A bocoder 39, a link layer 40, a channel cordiac 41, a radio section 42 and a modulator/demodulator 43 are provided on each of the two units. The bocoder 39 compresses and expands the PCM data. The linkk layer 40 is a radio controller for radio communication, and is divided into layers in dependence on the role of control. The channel cordiac 41 converts data from the link layer 40 or the bocoder 39 to a flame format of an iridium plan or terrestrial communication line by adding a preamble, unique words, error correction, a detection code, etc. The radio section 42 has a function of setting a radio channel of the iridium plan or terrestrial communication line and performs frequency conversion to a predetermined radio frequency. The modulator/demodulator 43 demodulates analog signal from the radio section 42 to digital data and extracts desired wave data via a band-limiting filter and an AGC, and also modulates digital data from the channel cordiac 41 and limits the modulated data to a minimum necessary band via a band-limiting filter. As batteries 44 and 45, dry cells, lithium ion cells, nickel-hydrogen cells and so forth are used and accommodated in the respective units.

The functions of the above circuit construction will now be described in connection with the embodiment shown in FIGS. 5(A) to 5(C), 6(A) and 6(B). By mounting the portable unit B in the base unit A, the switches 11F are automatically turned on. Then by turning on the power switch 2, the infrared transducers 3 and 12 of the units A and B are brought to a face-to-face relation and electrically coupled together. The LEDs 17F and 21 of the portable and base units B and A are thus turned on to notify that the iridium plan communication system line has been connected.

To make a call in this state, a call signal is transmitted from the side of the portable unit B by utilizing the call switch or the ten keys 16 provided therebelow. The call signal is coupled via the MMI 38 to the infrared transducer 12 in the portable unit B. The infrared transducer 12 converts the input call signal to infrared rays which are transmitted to the infrared transducer 3 on the side of the base unit A. The infrared transducer 3 demodulates the received infrared rays to the original signal. This signal is sent out via the radio section 42.

After the call transmission, the base unit receives the call-receive response of the opposite side, and then the off-hook of the opposite side unit is visually confirmed on the side of the portable unit B in the converse signal flow to that described above. Then, a predetermined service is started.

Speech signal from the microphone on the side of the portable unit B is converted in the cordiac 37 to PCM data, which is coupled via the infrared transducers 12 and 3 to the bocoder 39 in the base unit A. The PCM data thus can be sent out via the channel cordiac 41 and the radio unit 42 to the iridium plan communication system line.

The receive-call and receiving operations are performed in the same manners as above via the infrared transducers 12 and 3.

Where the highly directive infrared transducers 12 and 3 are used as in the above embodiment, these infrared transducers 12 and 3 should be held in direct face-to-face relation to each other for electric coupling. Suitably, the electric coupling can be obtained with low directivity and in a narrow transmission distance range of 1 to 5 m. In such a case, the electric coupling can be obtained by carrying the base and portable units A and B separately, for instance by putting the portable unit B in a suit pocket and putting the base unit A in a briefcase.

Figure 9:
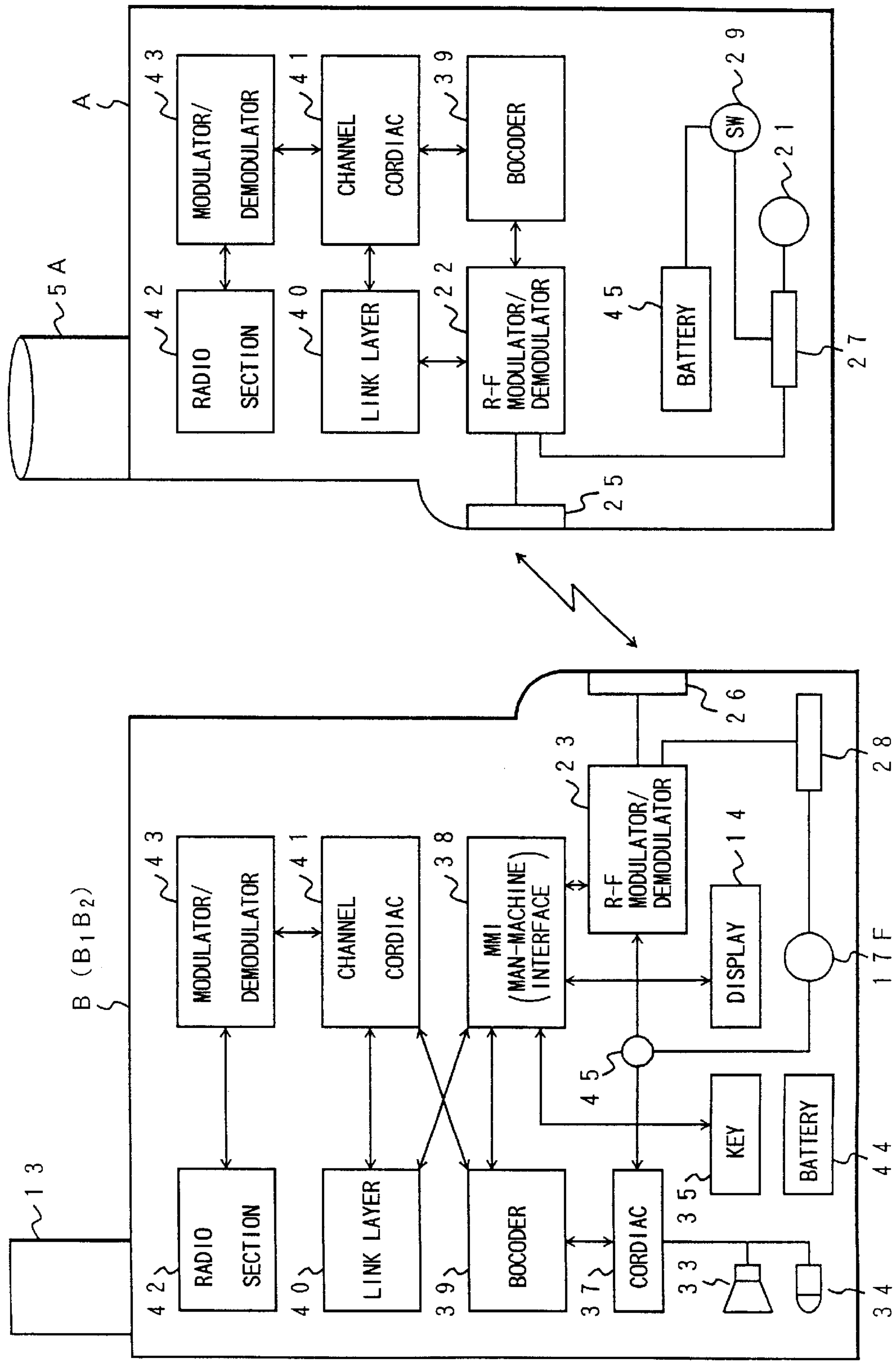
FIG. 9 is a block diagram showing the internal circuit construction of the portable unit B and the base unit for iridium plan satellite communication in each of the above embodiments, the two units being coupled together such that signals are mutually transmitted and received via r-f modulator/demodulators for generating and demodulating low directivity carrier waves.

FIG. 9 shows a block diagram such an embodiment. In this embodiment, planar antennas 25 and 26 for transmitting and receiving weak electromagnetic waves, are provided on the units A and B. The planar antennas 25 and 26 may be provided in any locality on the units A and B. In addition, r-f modulator/demodulators 22 and 23 for modulating the above PCM data or the like to the carrier waves and also demodulating the received carrier waves to PCM data or the like, are provided on the units A and B at predetermined positions thereof. Weak electromangetic waves (hereinafter referred to as carrier waves) obtained as a result of modulation in the r-f modulator/demodulators 22 and 23, can be transmitted and received between the planar antennas 25 and 26 with low directivity and in a narrow range of 1 to 5 m.

With the above construction, the functions noted above can be attained by modulating the PCM data or the like to carrier waves in the units A and B and transmitting the carrier waves via the planar antennas 25 and 26 and also demodulating the received carrier waves in the r-f modulator/demodulators of the other units B and A.

Particularly, unlike the previous embodiments, the carrier waves can be received via the planar antennas 25 and 26 of the units A and B even when the portable unit B is not mounted in the base unit A, for instance when the portable unit B is put in a suit pocket while putting the base unit A in a briefcase. When the user is in a region in which the carrier waves can be received, electric coupling controllers 27 and 28 provided on the units A and B detect this and, as a result, the key LED 17F of the portable unit B and the LED 21 of the base unit A are turned on, thus notifying that the iridium plan communication system line stand-by state prevails.

The user, even having the base unit A put in a briefcase, can confirm that the key LED 17F on the side of the portable unit B is "on", and enter into iridium plan communication.

When the portable unit B alone is carried, the user may get out of the region in which the carrier waves of the units A and B can be received. This is detected by the electric coupling controllers 27 and 28 of the units A and B. As a result, the key LED 17F of the portable unit Part B and the LED 21 of the base unit A are turned off or or provide red light, notifying that the iridium plan communication system line is no longer connected. Also, the electric coupling controller 27 on the side of the base unit A turns off the power switch 29, thus bringing about an "off" or non-stand-by state.

With the LED 17F of the portable unit B in the "off" state, the user visually confirms that iridium plan communication cannot be made and that it is possible to utilize the sole terrestrial communication line.

When the user carrying the portable unit B gets into the region in which the carrier waves can be received again, the electric coupling controllers 27 and 28 of the units A and B detect this. As a result, the power switch 29 of the base unit A is turned on again, and the LEDs 17F and 21 of the units B and A are turned on to notify that the iridium plan communication system line prevails.

Figure 10:
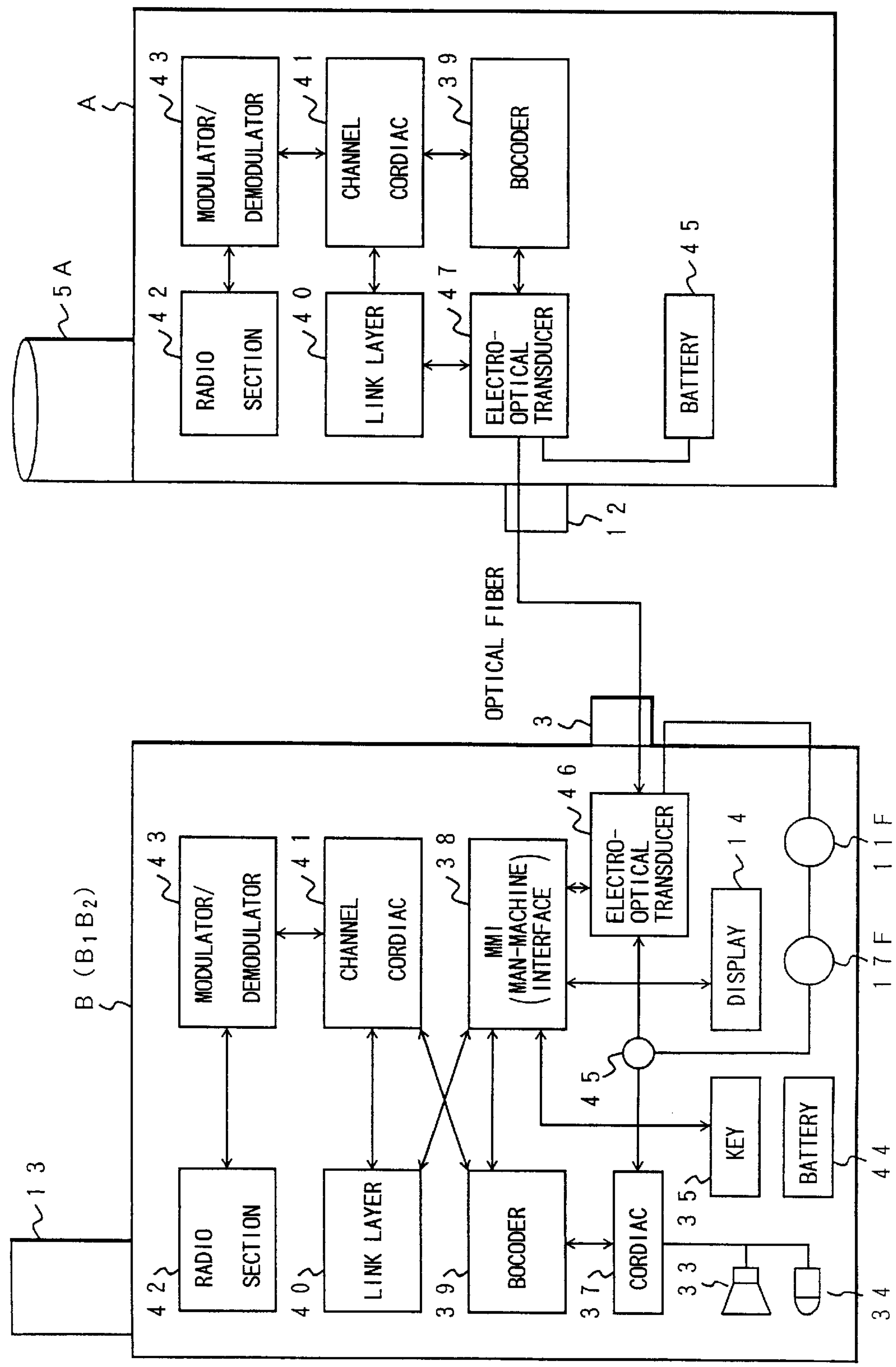
FIG. 10 is a block diagram showing the internal circuit construction of the portable unit B and the base unit A for iridium plan satellite communication in each of the above embodiments, the two units being coupled together such that signals are mutually transmitted and received via electro-optical transducers and an optical fiber therebetween.
Figure 11:
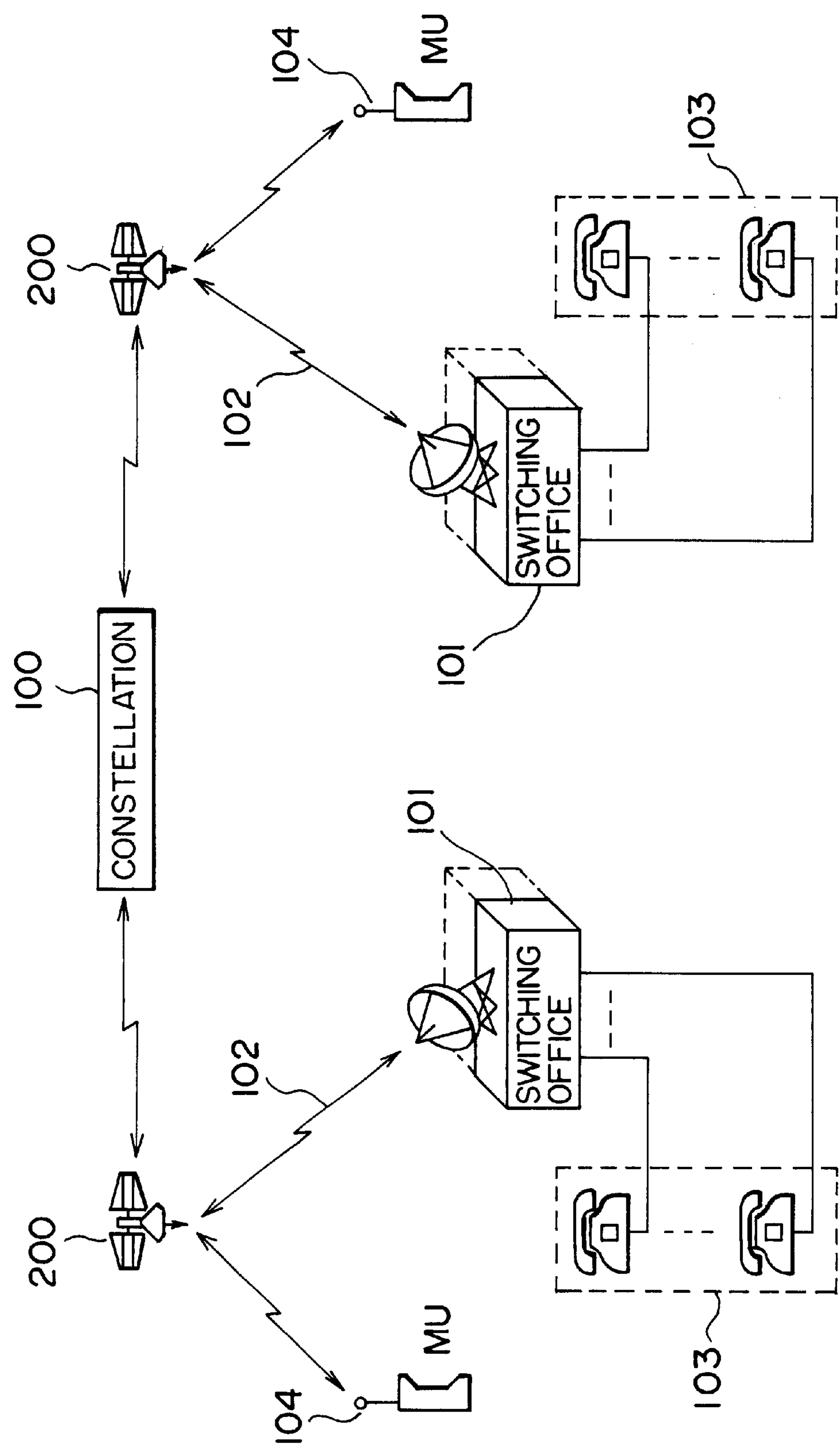
FIG. 11 is a view illustrating an iridium plan mobile satellite communication system utilizing a constellation arranged along orbits around the earth as network witching nodes.
Figure 12:
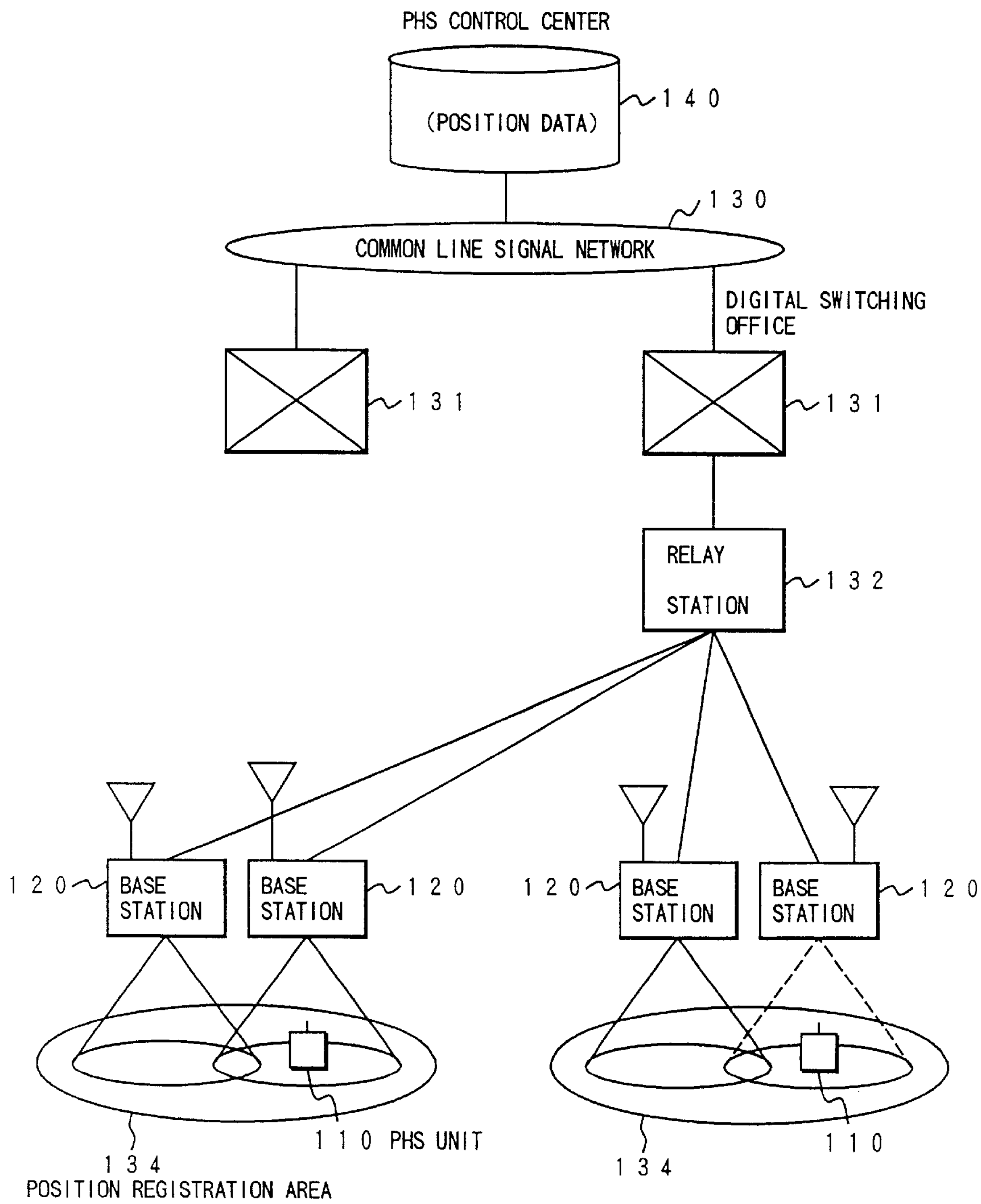
FIG. 12 is a view illustrating a well-known mobile communication system for PHS.

FIG. 10 shows a further embodiment, in which electro/optical transducers 46 and 47 are provided for transmitting and receiving signal via an optical fiber.

Effects of the Invention

As has been described in the foregoing, according to the present invention it is possible to selectively use two different unit functions, i.e., the mobile satellite communication unit function and the terrestrial communication unit function. When using the sole terrestrial communication unit function, unlike the prior art dual mode unit, no large and heavy unit frame need be carried, and the user is free from great weight burden.

According to the present invention, in addition to the provision of a unit which is suitable from the human engineering standpoint, it is possible to provide a dual mode mobile satellite communication unit which utilizes, for keying operation and also transmission and reception, a key operating section and a speech transducer section of a mobile terrestrial communication unit. Since it is possible to selectively use the mobile terrestrial communication unit for short distance communication and the mobile satellite communication unit for long distance communication, logical communication cost reduction can be obtained. Besides, since the key operating section and the speech transducer section are provided on the side of the mobile terrestrial communication unit alone, the weight burden of the mobile satellite communication unit can be correspondingly alleviated.

According to the present invention, for global communication such as iridium plan communication, a plurality of different terrestrial communication units for PHS or cellular system communication can be selectively used depending on areas where such units are sold and used. That is, it is readily possible to replace the terrestrial communication unit with those prescribed in various countries or areas.

According to the present invention, the provision of the hollow cylindrical antenna, the inner cylindrical space of which is used as a battery insertion space, Permits dispensing with any independent battery mounting space. This permits very great space saving particularly in the mobile satellite communication unit, which requires high power and large size battery power supply.

By constructing the antenna as a composite antenna comprising a microstrip planar antenna and a helical antenna in coaxial arrangement, it is possible to maintain line quality and also maintain communication sensitivity in all directions around the apex irrespective of variations of the position relation between satellite and antenna.

What is claimed is:

1. A dual mobile satellite communication unit providing a mobile terrestrial communication unit function in addition to a mobile satellite communication unit function, comprising:

a base unit not including at least a key operating section, a display section and a speech transducer section having a microphone and a loudspeaker and capable of providing the mobile satellite communication unit function; and a terrestrial communication portable unit including a key operating section, a display section and a speech transducer section having a microphone a loudspeaker and providing a pertinent mobile terrestrial communication unit function;

wherein recesses and projections are provided as mechanical couplers on the base unit and the portable unit for mechanically coupling the base unit and the portable unit to each other, and electric connectors are provided on the base unit and the portable unit for electrically connecting the key operation section, the display section and the speech transducer section having the microphone and the loudspeaker on the side of the terrestrial communication portable unit and a mobile satellite communication unit function section on the side of the base unit to one another when the base unit and the portable unit are mechanically coupled to one another.

2. The dual mode mobile satellite communication unit according to claim 1, wherein a single electric connector is provided for making the electric connection, and plural mechanical couplers capable of being held spaced apart by different distances are provided for the mechanical coupling of the base unit and the portable unit.

3. The dual mode mobile satellite communication unit according to claim 1, wherein a rail-like mechanical coupler movable in a predetermined axial direction is provided for the mechanical coupling, and an electric connector for the electric connection is disposed at the end of movement in the axial direction of the mechanical coupler and in a fixed plane containing the path of movement axis of the mechanical coupler.

4. A mobile satellite communication base unit not including at least a key operating section, a display section and a speech transducer section having a microphone and a loudspeaker, capable of providing a mobile satellite communication unit function and including a signal transceiver section for transmitting and receiving converted waves of transmission and reception signals to and from a separate terrestrial communication portable unit, said base unit utilizing a key operating section and speech transducer section of the portable unit via the signal transceiver section during mobile satellite communication.

5. A dual mode satellite communication unit comprising:

a mobile satellite communication unit not including at least a key operating section, a display section and a speech transducer section having a microphone and a loudspeaker, capable of providing the mobile satellite communication unit function and including a first converted wave transceiver section for transmitting and receiving converted waves of transmission and reception signals to and from a second converted wave transceiver section of a separate terrestrial communication portable unit;

the terrestrial communication portable unit including a key operating section, a display section and a speech transducer section having a microphone and a loudspeaker, providing a pertinent terrestrial communication unit function and including the second converted wave transceiver section for transmitting and receiving converted waves of transmission and reception signals to and from the first transceiver section of the mobile satellite communication unit, wherein the terrestrial communication portable unit is used for terrestrial communication; and the mobile satellite communication unit can be used as a base unit for transmission and reception via the first and second converted wave transceiver sections by utilizing the key operating section and the speech transducer section having the microphone and the loudspeaker of the portable unit during mobile satellite communication.

6. The dual mode mobile satellite communication unit according to claim 5, wherein when the terrestrial communication portable unit is carried alone, and moves beyond a range permitting transmission between the first and second converted wave transceiver sections, a stand-by state of the mobile satellite communication base unit is turned off.

7. A mobile satellite communication unit utilizing satellites orbiting around the earth as network switching nodes or a dual mode mobile satellite communication unit providing a mobile terrestrial communication unit function in addition to a mobile satellite communication unit function, wherein the unit comprises an antenna section including a microstrip planar antenna formed at an end, the antenna section having a hollow cylindrical shape defining a battery insertion space underneath the microstrip antenna.

8. The mobile satellite communication unit according to claim 7, wherein the unit has a vertically elongated frame having a large thickness portion formed on one side, the hollow cylindrical antenna being inserted in the large thickness portion.

9. The mobile satellite communication unit according to claim 7, wherein the antenna section is capable of elongation and contraction, tilting or rotation relative to the unit frame or secured to the unit frame.

10. The mobile satellite communication unit according to claim 7, wherein the antenna section is a composite antenna including a microstrip planar antenna and a helical antenna in coaxial arrangement.

11. A mobile satellite communication unit utilizing satellites orbiting around the earth as network switching nodes or a dual mode mobile satellite communication unit providing a mobile terrestrial communication unit function in addition to a mobile satellite communication unit function; wherein a frame of the unit has an asymmetric transversal sectional profile with respect to a front face having a key operating section and a display section, such that a large thickness portion is formed on one side and a small thickness portion on the other side behind the front face, a hollow cylindrical antenna being inserted in the large thickness portion, and an inner cylindrical space of the antenna being a battery insertion space.

12. A mobile satellite communication unit utilizing satellites orbiting around the earth as network switching nodes or a dual mode mobile satellite communication unit providing a mobile terrestrial communication unit function in addition to a mobile satellite communication unit function, wherein the unit has a front mounting section for mounting a separate mobile terrestrial communication unit and a large thickness portion formed on one side behind the mounting section, a hollow cylindrical antenna being inserted in the large thickness portion, an inner cylindrical space of the antenna being a battery insertion space.

13. The mobile satellite communication unit according to claim 12, which does not include at least a key operating section, a display section and a speech transducer section having a microphone and a loudspeaker and is capable of keying operation and transmission and reception by utilizing a key operating section and a speech transducer section of a mobile terrestrial communication unit which is detachably mounted in the mounting section.

14. A mobile satellite communication base unit not including at least a key operating section, a display section and a speech transducer section having a microphone and a loudspeaker, capable of providing a mobile satellite communication unit function, wherein a recess and a projection are provided as mechanical couplers on the base unit for mechanical coupling, and electric connectors are provided on the base unit for electrically connecting a key operation section, a display section and a speech transducer section on a side of a separate terrestrial communication portable unit and a mobile satellite communication unit function section on the side of the base unit to one another when the base unit and the terrestrial communication portable unit are mechanically coupled to one another.

* * * * *